(12) United States Patent  
Griesse

(10) Patent No.: US 7,286,191 B2  
(45) Date of Patent: Oct. 23, 2007

(54) DYNAMIC DISPLAY DEVICE

(76) Inventor: Matthew J. Griesse, 4735 E. Marginal Way South, Seattle, WA (US) 98134

( * ) Notice: Subject to any disclaimer, the term of this patent is extended or adjusted under 35 U.S.C. 154(b) by 867 days.

(21) Appl. No.: 10/715,785

(22) Filed: Nov. 18, 2003

(65) Prior Publication Data

US 2004/0100591 A1    May 27, 2004

Related U.S. Application Data

(60) Provisional application No. 60/427,653, filed on Nov. 19, 2002.

(51) Int. Cl.
*H04N 5/65* (2006.01)

(52) U.S. Cl. .................................................. 348/823

(58) Field of Classification Search ................ 348/834, 348/818, 373, 825, 59, 60, 823, 832, 826; 359/608, 267, 601, 609, 610, 611, 612, 602, 359/603, 614

See application file for complete search history.

(56) References Cited

U.S. PATENT DOCUMENTS

| | | | | |
|---|---|---|---|---|
| 4,330,813 A | | 5/1982 | Deutsch | |
| 4,354,205 A | * | 10/1982 | Lowe et al. | 348/832 |
| 4,357,771 A | * | 11/1982 | Olds | 40/444 |
| 4,427,264 A | * | 1/1984 | Kamerling | 359/601 |
| 4,612,583 A | | 9/1986 | Ayervais | |
| 5,075,993 A | | 12/1991 | Weinreich | |
| 5,227,916 A | * | 7/1993 | Theirl et al. | 359/609 |
| 5,630,482 A | | 5/1997 | Schwörer | |
| 5,689,371 A | * | 11/1997 | Butterfield | 359/609 |
| 6,405,496 B1 | | 6/2002 | Stewart et al. | |
| 6,578,972 B1 | * | 6/2003 | Heirich et al. | 359/608 |

* cited by examiner

*Primary Examiner*—Tung Vo  
*Assistant Examiner*—Behrooz Senfi

(57) ABSTRACT

A dynamic display device is disclosed, that is adapted to be removably attached to the front of a conventional monitor, such as a television monitor. The device intercepts the light emitted by the monitor to produce an abstract, moving display. An opaque grid structure forms a plurality of channels, including peripheral channels that are open along at least one side. A translucent panel wraps about the grid structure, and diffuses the light, displaying the diffused light on both the front and on the sides of the display device. An attachment mechanism, such as suction cups or a reusable adhesive, attaches the device to the monitor. The dynamic display device may be constructed as a unitary, inflatable structure having an internal grid and translucent sides and front.

13 Claims, 4 Drawing Sheets

DYNAMIC DISPLAY DEVICE

CROSS-REFERENCE TO RELATED APPLICATION

This application claims benefit of U.S. Provisional Patent Application No. 60/427,653, filed on Nov. 19, 2002, which is incorporated herein by reference.

FIELD OF THE INVENTION

The present invention relates generally to entertainment devices and, more specifically, to devices for producing a dynamic visual display.

BACKGROUND OF THE INVENTION

Various types and varieties of light displays are common and frequently used to produce an interesting and aesthetic visual display that may include a variety of colors and/or flashing and sequencing—for example, to simulate motion. Such displays are typically used for personal use or for mood at social events. Most of these devices use one or more internal light sources and are restricted to a limited variety of color possibilities. These units may include colored lights, color filters, electronics, and/or motors to achieve luminance, color, and movement. The more elaborate devices are costly and difficult to produce, and may be limited to a set variety of color and movement.

U.S. Pat. No. 4,354,205, to Lowe et al., describes an image-modifying television attachment using the image generated by a television to produce an abstract display of lights. The Lowe et al. patent describes a narrow (¼-inch) opaque frame that houses a reflective, two-inch lattice. A planar, translucent screen is mounted in front of the lattice. A flexible hook-and-loop type hanger strap engages a mating strap that is glued to the front or top of a television. Though a fairly resolved device, there a number of disadvantages to this design. For example, the device requires the users to glue a piece to their existing television. Also, the translucent screen fits within an opaque housing, which blocks at least a portion of the display. Another disadvantage is that the display is planar, and therefore does not provide any image viewable from the side. Also, although the frame structure has a curved back edge, the lattice structure has a planar back edge, which would not conform well to conventional television displays. Finally, this device requires many parts and costly manufacturing techniques.

A similar device is disclosed in U.S. Pat. No. 4,357,771, to Olds, although rather than utilizing a lattice, Olds discloses a light-collector means comprising a solid rectangular body that has been perforated to provide a plurality of light-collector channels. Similar to Lowe et al., Olds also teaches a planar translucent screen element that is housed in an opaque housing, and the light-collector has a planar rearward surface. Therefore, the apparatus disclosed by Olds shares the disadvantages discussed above.

Many of the disadvantages found in the prior art are overcome by the present invention.

SUMMARY OF THE INVENTION

A dynamic display device is disclosed that is attachable to a monitor, such as a television monitor, to convert the light/image from the monitor into a moving, abstract display. The dynamic display device includes an opaque grid lattice defining a number of parallel channels that extend generally outwardly from the monitor, including a number of open peripheral channels. The channels of the lattice are open at the front and back, and the peripheral channels are also open on at least one open side. A translucent panel is attached to the lattice, covering the open forward ends and the open sides of the channels. Attachment devices, such as suction cups, are attached to the lattice for releasably installing the device on the monitor. Light from the monitor entering the channels is diffused and visible through the translucent panel covering the open forward ends and the open sides of the peripheral channels.

An object of the invention is to provide an easily manufactured, lightweight device that is releasably attachable to a monitor and that intercepts the light from the monitor to produce a dynamic abstract display.

In an embodiment of the invention, the grid lattice and translucent panel are formed such that the device is inflatable.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
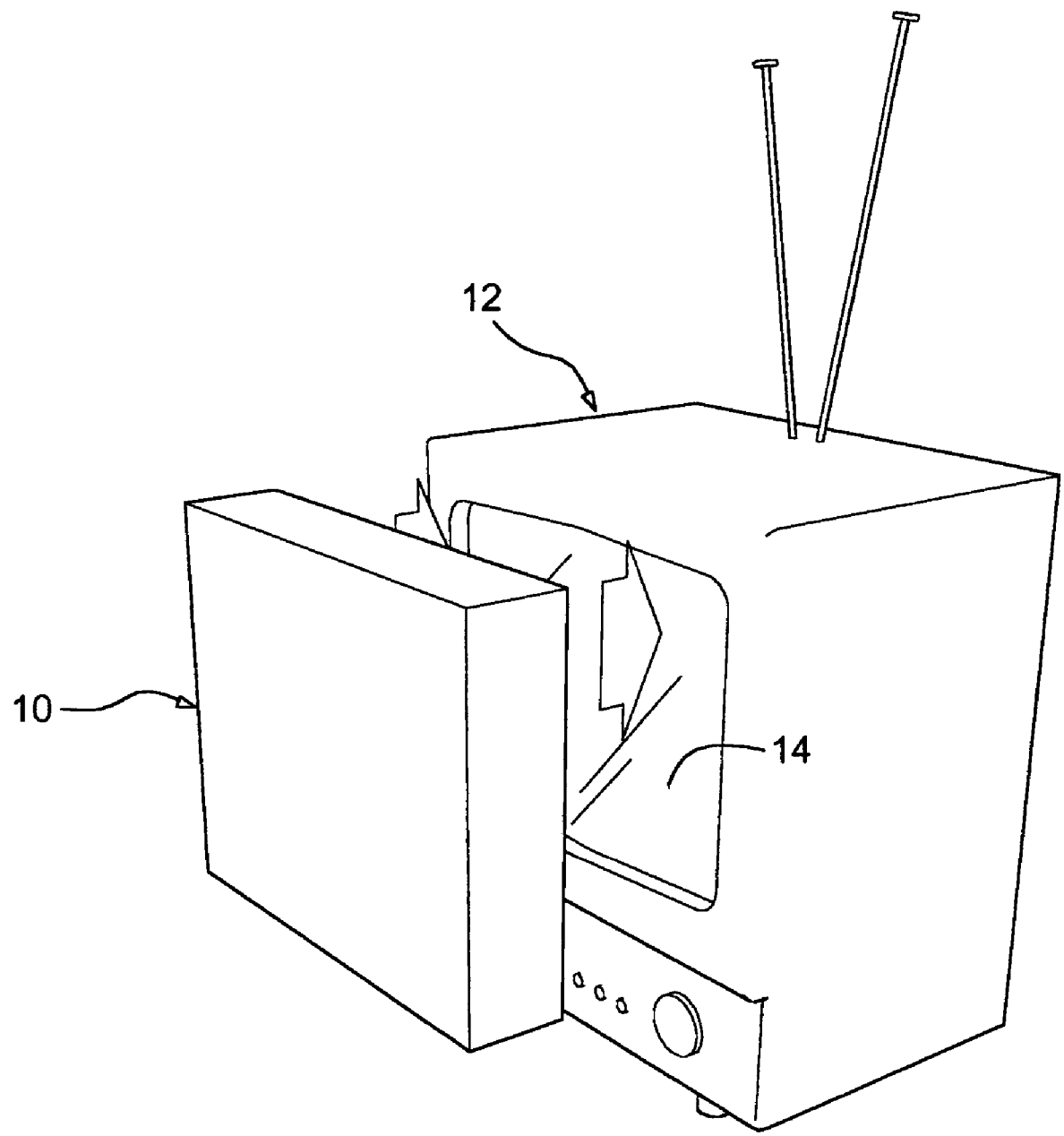
FIG. 1 is a perspective view of a dynamic display device shown affixed to television, according to the present invention.

Now referring to the drawings in detail and initially to FIGS. 1-4 thereof, a first preferred embodiment of a dynamic display device 10, according to the present invention, is disclosed. While one size is shown in the following drawings, it will be readily apparent that the device may be made in any number of sizes to accommodate the variety of televisions on the market.

FIG. 1 shows a perspective view of the dynamic display device 10 being attached to the screen 14 of a common television receiver or other monitor 12. The device 10 is designed to attach to the screen 14 using suction cups 24a and 24b (FIG. 2).

Figure 2:
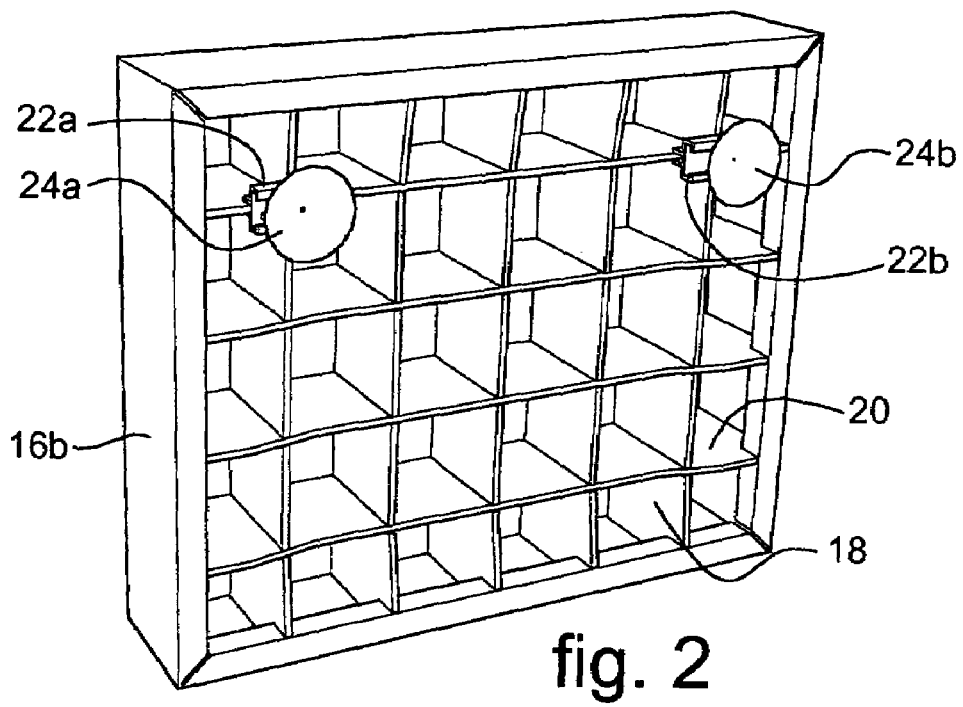
FIG. 2 is a back perspective view of the dynamic display device shown in FIG. 1.
Figure 4:
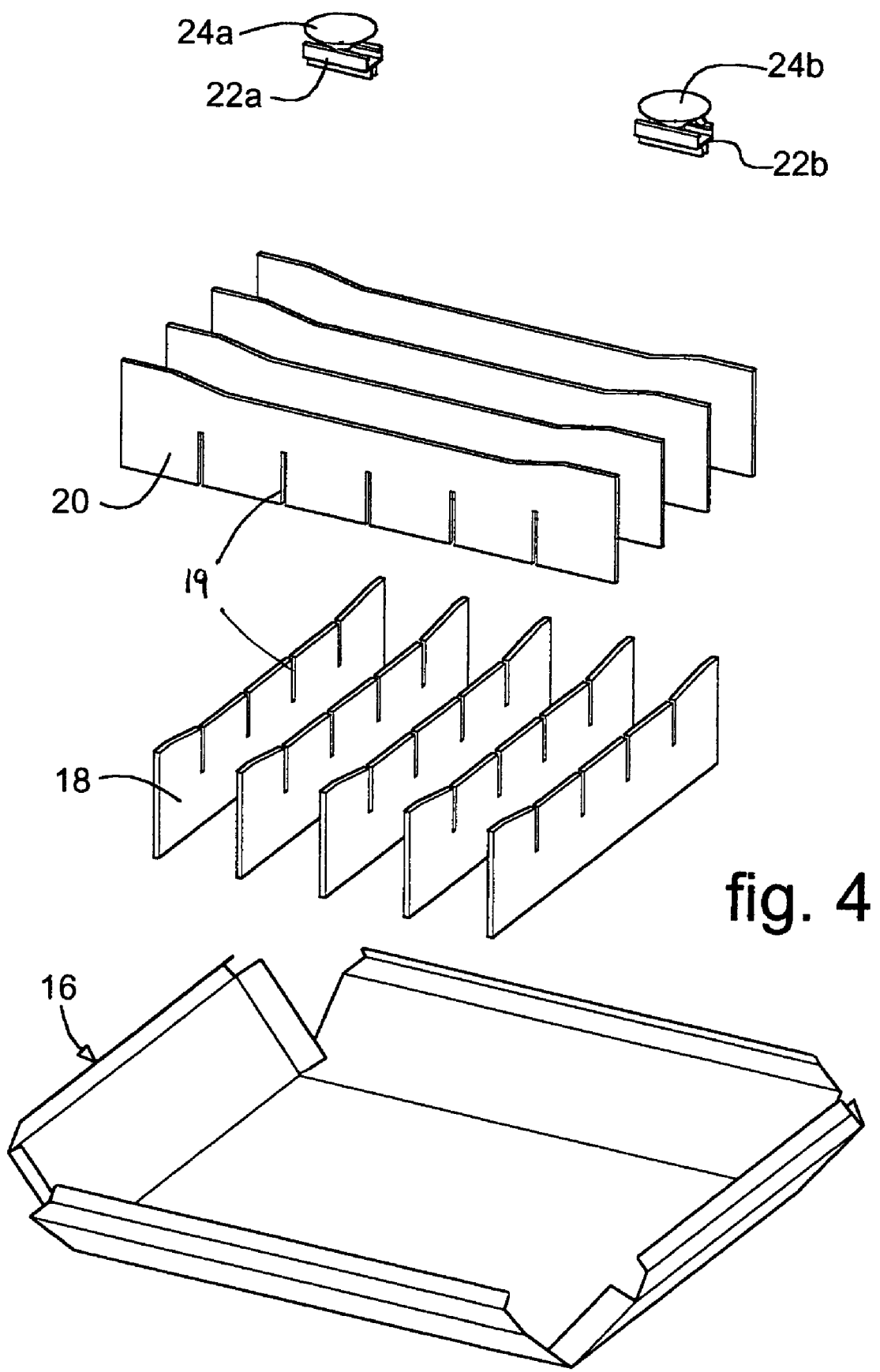
FIG. 4 is an exploded perspective view of the dynamic display device shown in FIG. 1.

As seen most clearly by comparing FIGS. 2 and 4, the main structural elements of the display device 10 are a lattice structure shown formed with vertical and horizontal grid elements 18 and 20, a unitary, translucent, folded panel 16 that defines a three-dimensional structure having translucent front and side portions, and at least one suction cup (two shown) 24a, 24b for attaching the dynamic display device 10 to a monitor 12.

Figure 3:
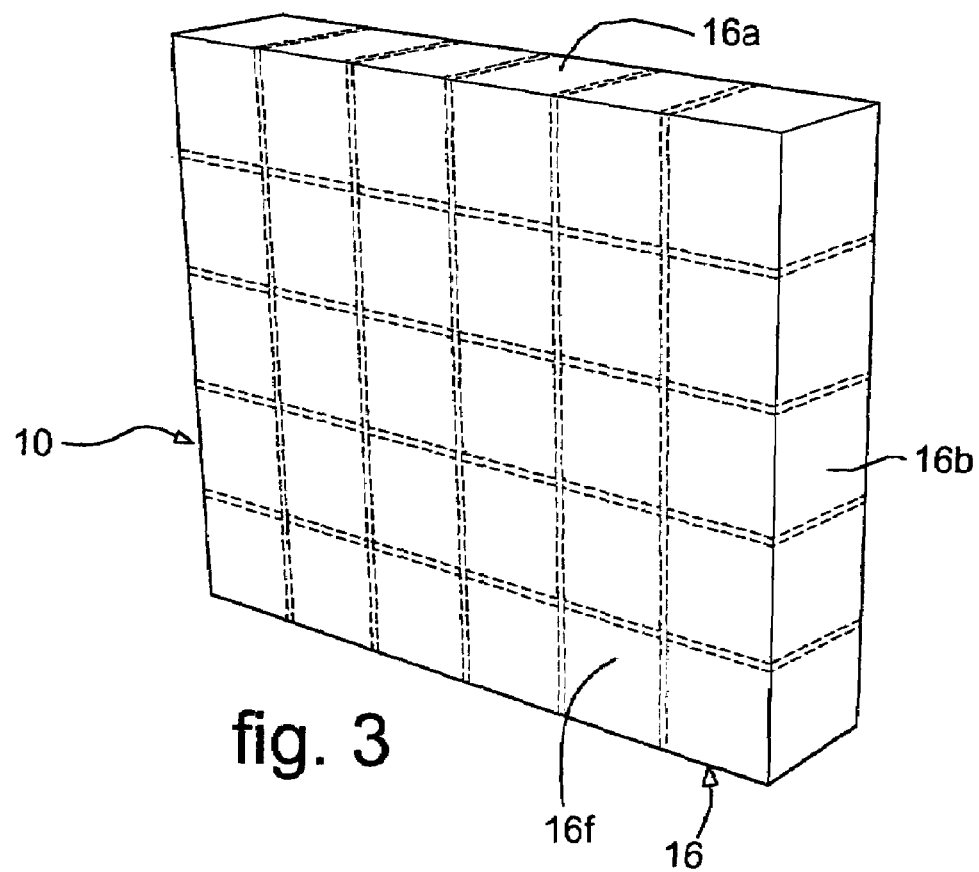
FIG. 3 is a front perspective view of the dynamic display device shown in FIG. 1.

The grid elements 18, 20 include cooperative slots 19 that are adapted to slidably engage together and form a rigid framework to which the other elements of display device 10 attach. The grid elements 18 and 20 are made of white, opaque, plastic material, such as an expanded (foamed) polyvinylchloride ("PVC") sheet, and the assembled framework is open about the periphery of the grid structure. In a preferred embodiment, if the display device 10 is to be used with a conventional CRT monitor 12 having a curved display surface, the grid elements 18, 20 are contoured along their rearward edge to approximately accommodate the curvature of the screen 14. The grid elements 18, 20 front edge, and ends are generally flat to smoothly abut the translucent folded panel 16, to facilitate the generation of a flat crisp display at it's front surface 16f and it's side surfaces 16a, 16b (FIG. 3).

In the preferred embodiment, the folded panel 16 is a lightweight diffusing translucent plastic material, such as a sheet of rigid PVC, 0.010 to 0.050 inches thick. In the presently preferred embodiment, the folded panel 16 is die cut from a single sheet of material and folded into its box like shape. The material must be lightweight to allow it to be easily supported, flexible enough to be formed into the desired three-dimensional shape, and have suitable light diffusing properties. The folded panel 16 is disposed about the lattice defined by the grid elements 18, 20. The suction cups 24a and 24b are attached to the grid elements 18 and/or 20 by cup holders 22a, 22b. The cup holders 22a, 22b frictionally attach to the edge of grid elements 18, 20 and engage the enlarged head portions of the suction cups 24a, 24b.

It will be appreciated that the disclosed dynamic display device 10 provides a very simple, easily constructed, and lightweight apparatus that may be readily attached to and removed from a television set or other display device. Moreover, utilizing a rectangular, solid-shaped display element, i.e., folded panel 16, provides a visual display that can be viewed in part even when the user is located to the side of the display device. The contoured rearward edge of the grid elements 18, 20 improves the quality of the display by reducing leakage of light between adjacent cells, and provides a closed fit between the dynamic display device 10 and the monitor 12.

The dynamic display device 10 is easily assembleable and utilizes a minimal number of components. To assemble the device, the grid elements 18, 20 are fabricated to size, with mating slots, and assembled to form the desired grid structure. The translucent folded panel is die cut and scored, and is wrapped about the fronts and sides of the grid structure formed by the grid elements 18, 20, and attached thereto. The suction cups 24a, 24b, including the cup holders 22a, 22b are then attached to the grid elements 18, 20.

Figure 5:
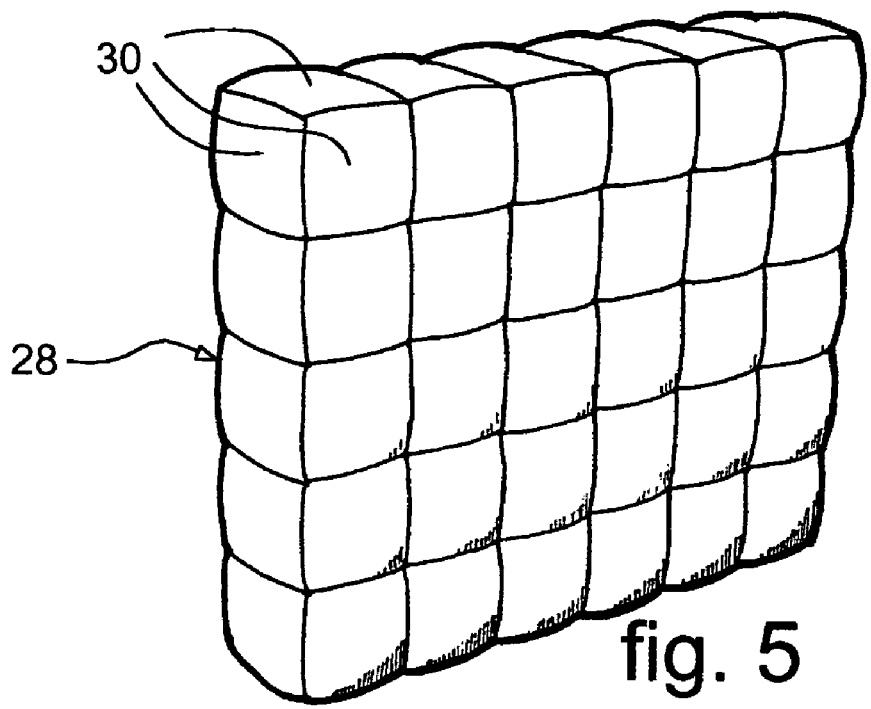
FIG. 5 is a front perspective view of a second embodiment of a dynamic display device, according to the present invention.
Figure 6:
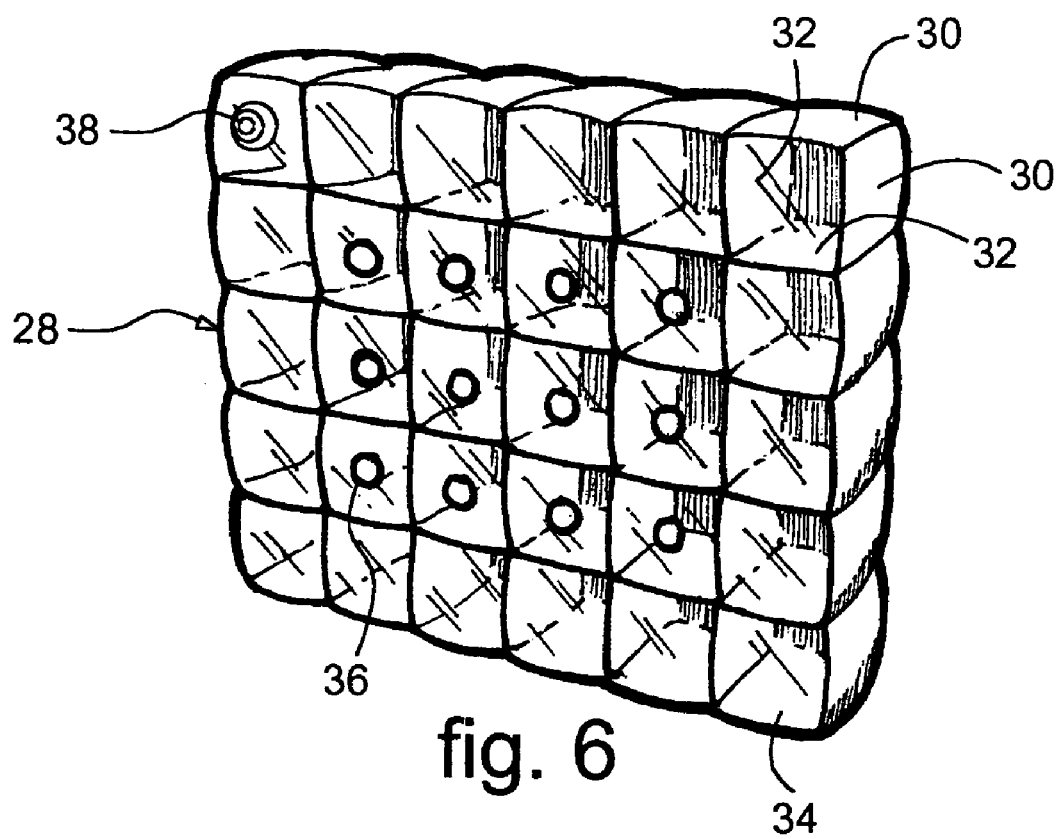
FIG. 6 is a back perspective view of the dynamic display device shown in FIG. 5.

FIGS. 5 and 6 show an alternative embodiment of a dynamic display device that produces a display very similar in function as the previous embodiment, but being manufactured in an entirely different way. The dynamic display device 28 of this second embodiment is constructed generally as a unitary, hollow, and generally rectangular member, with an internal grid. The dynamic display device 28 is formed from a flexible plastic and adapted to be inflated. The dynamic display device 28 is formed using a white translucent material 30 on its sides and front surfaces, such that the display functions similar to the translucent folded panel 16 in the previous embodiment.

FIG. 6 shows the back perspective view of the dynamic display device 28. Preferably, a clear material 34 is used at its back face, letting a maximum amount of light and color from the monitor 12 enter the device. Preferably, an opaque material 32 forms the internal grid, or is applied to the internal grid, to create the light channels for optimal light diffusion. An air valve 38 is provided for inflation and deflation of the dynamic display device 28. It will be appreciated that the air valve 38 may be located in any convenient location on the device 28.

In the preferred embodiment, one or more sections of removable, reusable adhesive material 36—for example, Microsuction™ tape, available from Manco, Inc.—is provided for attaching the device to a light emitting screen. Alternatively, one or more suction cups could also be used to attach the dynamic display device 28 to the monitor 12.

The manner of using either embodiment of dynamic display device 10, 28 is simple. The user simply presses the attachment device, such as the suction cups 24a, 24b onto the screen of a light-emitting source, such as a television monitor, with the device 10, 28 in the desired position. The television may then be tuned to any channel—for example, a music video channel—and the light and color emitting from the screen will be dynamically displayed in an abstract pattern.

While currently preferred embodiments of a dynamic display device are disclosed herein, it will apparent to persons of skill in the art that straightforward variations on the disclosed embodiments may readily be made without departing from the present invention. For example, although two suction cups 24a, 24b are disclosed, one or more than two suction cups could alternatively be used, or alternate attachment mechanisms, such as reusable adhesives or gels, or the like, could be used to achieve the same result. Also, for example, the suction cups may be provided with a mechanism for breaking the suction to facilitate removal of the device.

As another alternative, the internal grid elements 18 and 20 may be manufactured as a single piece. Other manufacturing techniques, like injection molding or vacuum forming, could be utilized to achieve this. Alternatively, the translucent panel 16 and opaque internal grid elements 18, 20 may be formed unitarily. The translucent panel 16 may also be formed by another manner than die cut and folded—such as by injection molding or thermal forming into its shape. Also, the translucent panel 16 may alternatively be made from different translucent materials, such as paper, high-density polyurethane, or polycarbonate sheet.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A dynamic display device adapted to be positioned over a monitor, the dynamic display device comprising:
   an opaque grid lattice defining a plurality of parallel channels including a plurality of peripheral channels, each channel having an open rearward end and an open forward end, and wherein peripheral channels include at least one open side;
   a translucent panel attached to the grid lattice such that the translucent panel covers the open forward ends of the plurality of channels and covers the open sides of the plurality of peripheral channels; and
   an attachment means connected to the grid lattice, for removably attaching the dynamic display device to the monitor;
   wherein light entering the plurality of channels will be visible through the portions of the translucent panel covering the open forward ends of the channels, and light entering the plurality of peripheral channels will be visible through the portions of the translucent panel covering the open sides of the plurality of peripheral channels.

2. The dynamic display device of claim 1, wherein the opaque grid lattice includes a rearward portion that is contoured to approximately conform to the monitor.

3. The dynamic display device of claim 1, wherein the opaque grid lattice comprises a plurality of slotted horizontal grid elements and a plurality of slotted vertical grid elements, and wherein the vertical and horizontal grid elements are adapted to be slidably interconnected.

4. The dynamic display device of claim 3, wherein the opaque grid lattice is formed from expanded polyvinylchloride material.

5. The dynamic display device of claim 1, wherein the translucent panel comprises a unitary sheet of rigid polyvinylchloride material having a thickness between 0.010 and 0.050 inch.

6. The dynamic display device of claim 5, wherein the translucent panel is die cut and scored to fold over the grid lattice.

7. The dynamic display device of claim 1, wherein the attachment means comprises one or more suction cups.

8. The dynamic display device of claim 1, wherein the opaque grid lattice is formed unitarily with the translucent panel, the device further comprising a clear rearward panel and a closable valve, wherein the device is adapted to be inflated.

9. A method for making a dynamic display device that is adapted to be attached to a monitor, the method comprising the steps of:

forming a grid structure defining a plurality of channels that is open at the top and at the bottom, the plurality of channels including peripheral channels that are open along at least one side;

forming a translucent panel that is adapted to be attached to the grid structure such that the translucent panel covers at least the open top ends and open sides of the plurality of channels;

attaching the translucent panel to the grid structure; and attaching a removable attachment means to the grid structure such that the dynamic display device is releasably attachable to the monitor, such that light emanating from the monitor is visible from the fronts and sides of the dynamic display device.

10. The method of claim 9, further comprising the step of contouring the grid structure to approximately conform to the shape of the monitor.

11. The method of claim 9, wherein the attachment means comprises at least one suction cup.

12. The method of claim 9, wherein the translucent panel comprises a die cut sheet of rigid polyvinylchloride, that is scored to facilitate wrapping the translucent panel about the grid structure.

13. The method of claim 9, wherein the grid structure comprises interlocking vertical and horizontal grid elements made of an expanded polyvinylchloride.

\* \* \* \* \*